Chester W. Carbaugh
INVENTOR.

BY Eugene D. Farley
Atty.

United States Patent Office 3,413,710
Patented Dec. 3, 1968

3,413,710
METHOD FOR EDGE JOINING WOOD VENEERS
Chester W. Carbaugh, Rte. 4, Box 619,
Salem, Oreg. 97302
Filed Sept. 3, 1965, Ser. No. 484,937
4 Claims. (Cl. 29—429)

ABSTRACT OF THE DISCLOSURE

Wood veneers are edge joined to form plywood core veneer by arranging a pair of veneers of random width side by side on a support, one on each side of a thin abutment. The ends of the veneers are aligned. One of the veneers is pressed against one side of the abutment. The other veneer is pressed resiliently against the other side of the abutment. The veneers then are stapled or otherwise fastened together edge to edge, after which the abutment is retracted.

---

This invention pertains to a method for edge joining wood veneers. It pertains particularly to a method for edge joining veneer pieces of random width to form a core veneer useful in the manufacture of plywood.

In the plywood industry it is the usual practice to manufacture the center plies to be used in the fabrication of five-ply plywood by edge uniting plywood pieces of predetermined width. For example, in making 4 x 8 foot sheets of five-ply plywood the core ply is fabricated from two strips of veneer, both approximately 101 inches long and having widths of 24 inches and 26 inches respectively. The resulting core ply is laid up with two intermediate and two surface plies of approximately the same size in the usual manner. After pressing, the resulting panel is trimmed to its finished size of 4 x 8 feet.

It is the general object of the present invention to provide a method for making the core ply of multi-ply plywood from strips of random width which otherwise would be discarded as scrap, thereby effectuating substantial economies and conservation of material.

It is a further object of the present invention to provide a method for edge joining plywood veneers rapidly and continuously, using apparatus readily adapted for inclusion in the conventional plywood mill production line.

Figure 1:
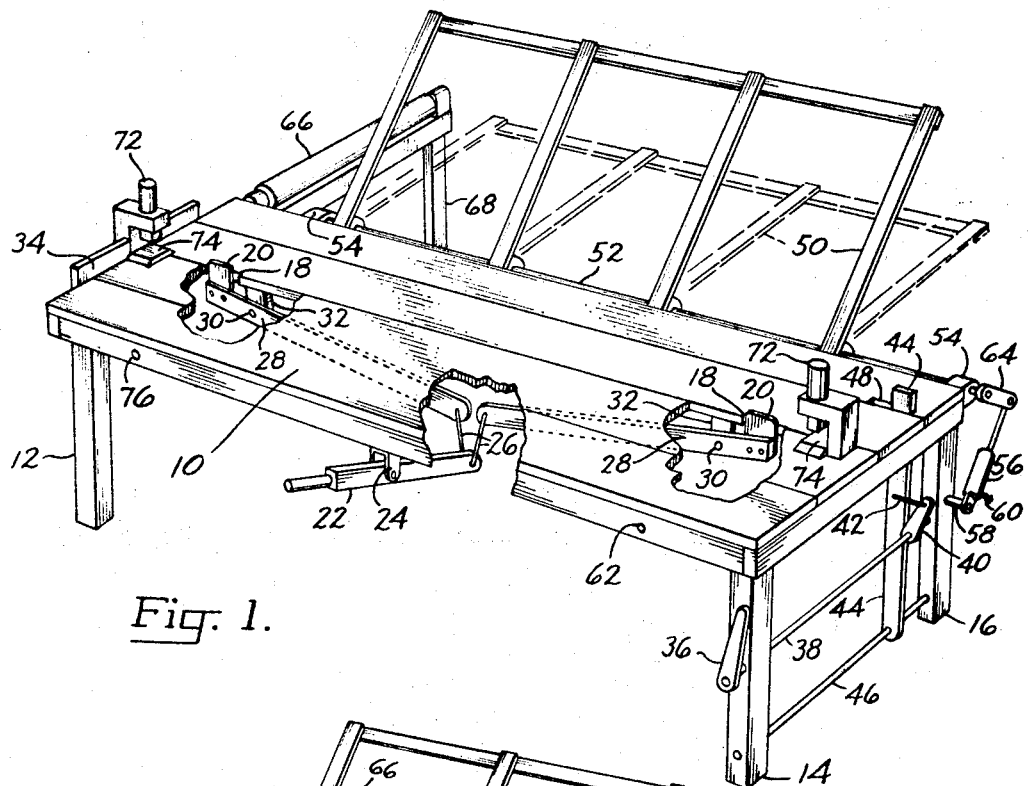
Figure 2:
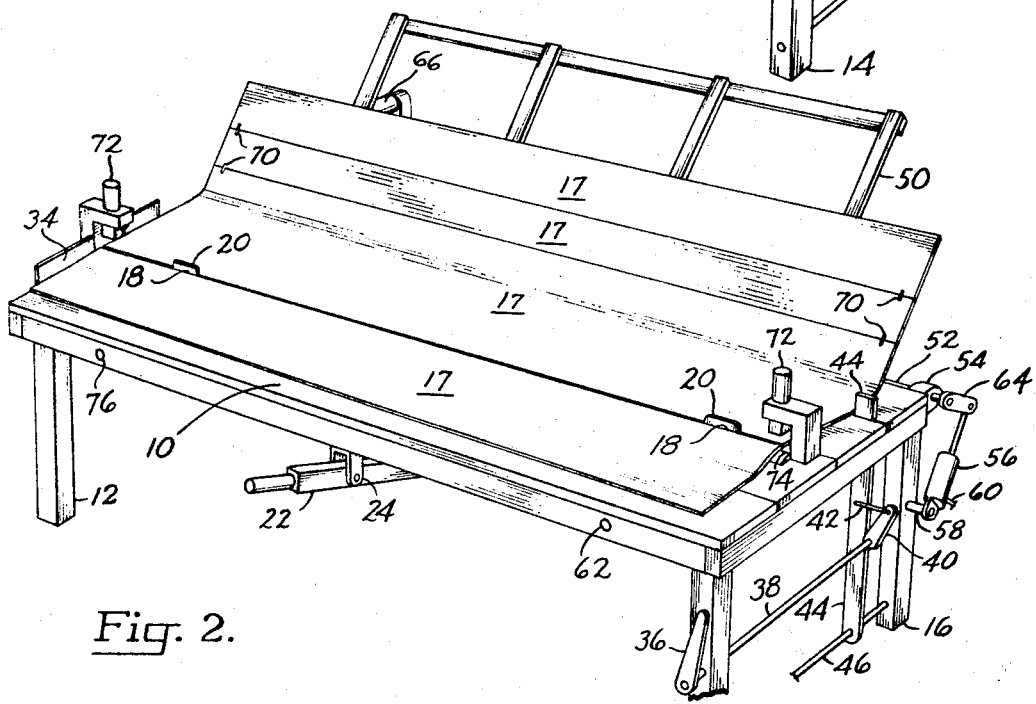

The manner in which the foregoing and other objects of the invention are accomplished will be apparent from the accompanying specification and claims considered together with the drawings, wherein:

FIGS. 1 and 2 are prespective views of the herein described apparatus for edge joinging wood veneers, FIG. 1 being partly broken away, without the work being shown, and FIG. 2 showing the work in place on the apparatus illustrating the manner in which the veneer pieces are fastened edge to edge.

As shown in FIG. 1 the presently described apparatus for edge joining wood veneers includes a table having a top 10, legs 12 on one side and legs 14, 16 on the other side.

Table top 10 is of sufficient extent to underlie and support plywood veneers 17. It is provided with longitudinally spaced, aligned, centrally located guide slots 18. These receive abutment means whose function is to locate two pieces of veneer in side edge to side edge aligned relation to each other.

In the illustrated form of the invention, the abutment means comprise a pair of thin plates 20 dimensioned for reception in guide slots 18 and associated with means for shifting them between an extended operative position and a retracted, inoperative position.

The shifting means employed comprises a lever 22 adjacent the operator on the infeed side of the table and fulcrumed intermediate its ends on pin and clevis 24 mounted on the underside of the table.

The inner end of lever 22 pivotally mounts a pair of stiff connectors 26 each of which is connected pivotally to the inner end of a longitudinally arranged lever 28. Levers 28 are pivoted on pins 30 projecting laterally from brackets 32 which depend from the underside of the table top.

Abutment plates 20 are fixed to the outer ends of levers 28, the arrangement being such that by moving operating lever 22 the plates may be extended to a plane above the plane of table top 10, or retracted to a plane below the plane of the table top.

As noted above, abutment plates 20 are provided for locating a pair of veneers in side edge to side edge aligned relationship with respect to each other. End abutment means also are provided for aligning the ends of the veneer pieces. Such means comprise an abutment plate and lever means for forcing the veneer pieces endwise against the same.

The abutment plate, indicated at 34, is mounted at the end of the table, above legs 12. It projects above the plane of table top 10.

The lever means employed for pushing the veneer pieces against end abutment plate 34 comprise an operating lever 36 convenient to the operator at the infeed side of the table. The end of the operating lever is keyed to a rock shaft 38 journaled in legs 14, 16.

Intermediate its ends, shaft 38 mounts the inner end of a lever 40 to the outer end of which pivotally is connected one link 42. The other end of link 42 pivotally is connected to a push lever 44, the lower end of which pivotally is mounted on a shaft 46. This shaft, like rock shaft 38, is mounted between legs 14, 16.

The outer end of push lever 44 extends through a slot 48 in the end of table top 10. Accordingly, by the operation of lever 36, push lever 44 may be actuated to push veneer pieces resting on the table top against end abutment plate 34, thereby aligning their end edges.

Means also are present for pressing the veneer pieces remote from the operator against the far side of abutment plates 20.

This effect is achieved gravitationally by employing a rack 50 located on the outfeed side of the table. Rack 50 is of sufficient length and width to receive pieces of wood veneer of the desired size. It is fixed to a rock shaft 52 journaled in bearings 54. These in turn are mounted on the outfeed margin of the table.

Rack 50 is adjustable angularly between the elevated full line position of FIG. 1 and the horizontal dotted line position of the same figure. This is accomplished by means of a fluid operated drive including the single-acting, fluid-operated cylinder 56, the lower end of which is pivoted to a stub shaft 58 extending outwardly from table leg 16. Cylinder 56 is fed with fluid under pressure from a suitable source through line 60. It is controlled from a switch 62 located conveniently to the operator as he stands on the infeed side of the table.

The piston rod of cylinder 56 is pivoted to the outer end of a connecting link 64. The inner end of the link is fixed to rock shaft 52.

Accordingly, upon depressing switch 62, cylinder 56 may be adjusted to its extended position, raising rack 50. It thereafter is returned gravitationally to its lowered, horizontal position.

Conveyor means including an idler or drive roll 66 rotatably mounted on a frame 68 are mounted on one end of the table, aligned with rack 50 when it is in its lowered, horizontal position.

Fastening means are provided for fastening together the meeting edges of the aligned pieces of veneer, located by abutment plates 20, 34. Although various types of fastening means may be employed, it is preferred to use staples 70 applied by conventional staplers 72 mounted one on each end of the table over cooperating bed plates 74. Staplers 72 are aligned with abutment plates 20 and are operative upon energization (switch 76) to staple together the ends of the veneer pieces.

*Operation*

In operating the apparatus above described, the operator puts a first veneer 17 on the far side of abutment plates 20. He puts a second piece on the near side thereof. By operation of lever 42, he presses against the end of the first veneer, thereby pressing it against end abutment plate 34. The second piece of veneer is maintained in abutment against this plate manually.

Staplers 72 are energized stapling the two pieces together.

Lever 22 is operated to depress abutment plates 20. The stapled pieces are pushed toward the outfeed side of the table, beyond retractable abutment plates 20. This may carry the pieces to a position in which they are partly elevated by rack 50. Lever 22 again is manipulated to elevate retractable abutment plates 20. Thereupon the elevated margins of the stapled pieces cause the pieces gravitationally to press against the far sides of plates 20.

Lever 42 is operated to press the stapled pieces against end abutment plate 34. A third piece of veneer is pressed manually by the operator against the near faces of abutment plates 20, and against the face of end abutment plate 34. The stapler again is operated to fasten the ends of the veneers together.

This sequence is repeated until a veneer sheet of the desired width has been built up.

Cylinder 56 then is energized to lower rack 50 to its horizontal position. Thereupon the composite veneer sheet may be discharged over roll 66. It then is transferred to the production line of the plywood mill, where it is used as a core component of the plywood assemblies.

It is to be noted that the staples employed are removed from the finished plywood when it is trimmed to size.

It accordingly will be seen that there is provided an apparatus in which the several objects of this invention are achieved and which is well adapted for the conditions of practical use.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. The method of edge joining wood veneers which comprises
    (a) arranging a pair of veneers side by side on a support, on on each side of a thin abutment,
    (b) aligning the ends of the veneer pair,
    (c) pressing the first veneer against one side of the abutment,
    (d) elevating the second veneer with respect to the support for gravitationally pressing it against the other side of the abutment, thereby locating the veneers in aligned edge to edge relation,
    (e) fastening the veneers together while maintaining them in alignment, and
    (f) retracting the abutment.

2. The method of claim 1 wherein the veneers are fastened together by stapling their ends.

3. The method of edge joining wood veneers which comprises
    (a) arranging a pair of veneers side by side on a support, one on each side of a thin abutment,
    (b) aligning the ends of the veneer pair,
    (c) pressing the first veneer against one side of the abutment,
    (d) resiliently pressing the second veneer against the other side of the abutment, thereby locating the veneers in aligned edge to edge relation,
    (e) fastening the veneers together while maintaining them in alignment, and
    (f) retracting the abutment.

4. The method of edge joining wood veneers which comprises
    (a) arranging a pair of veneers side by side on a support, one on each side of a thin abutment,
    (b) pressing the first veneer against one side of the abutment,
    (c) elevating the second veneer with respect to the support for gravitationally pressing it against the other side of the abutment, thereby locating the veneers in aligned edge to edge relation,
    (d) fastening the veneers together,
    (e) retracting the abutment with respect to the veneers,
    (f) moving the fastened veneers to an elevated position beyond the abutment,
    (g) elevating the abutment,
    (h) pressing a third veneer against the abutment in aligned edge to edge relation with the fastened veneers, and
    (i) fastening the third veneer to the veneers already fastened together.

References Cited

UNITED STATES PATENTS

| | | | |
|---|---|---|---|
| 1,745,596 | 2/1930 | Bliss et al. | 29—432.2 |
| 2,944,337 | 7/1960 | Coleman | 29—526 |

THOMAS H. EAGER, *Primary Examiner.*